United States Patent [19]

Tokizaki

[11] Patent Number: 5,381,954
[45] Date of Patent: Jan. 17, 1995

[54] TEMPERATURE CONTROL APPARATUS

[75] Inventor: Hisashi Tokizaki, Ora, Japan

[73] Assignee: Sanyo Electric Co., Ltd., Moriguchi, Japan

[21] Appl. No.: 122,644

[22] Filed: Sep. 16, 1993

[30] Foreign Application Priority Data

Sep. 18, 1992 [JP] Japan .................. 4-275419

[51] Int. Cl.⁶ .............................................. G01K 7/00
[52] U.S. Cl. ..................... 236/78 D; 165/26; 374/171; 364/557
[58] Field of Search ............. 374/183, 170, 171; 165/26; 236/1 R, 78 D, 91 G; 364/557

[56] References Cited

U.S. PATENT DOCUMENTS

| | | | |
|---|---|---|---|
| 4,161,880 | 7/1979 | Prosky | 374/171 |
| 4,206,872 | 6/1980 | Levine | 236/46 R |
| 4,484,050 | 11/1984 | Horinouchi et al. | 374/172 X |
| 4,755,958 | 7/1988 | Mizuhara | 364/55 T |
| 5,115,967 | 5/1992 | Wedekind | 246/46 R |

FOREIGN PATENT DOCUMENTS 1934672 1/1971 Germany .
3036298 4/1981 Germany .

Primary Examiner—William E. Wayner
Attorney, Agent, or Firm—Darby & Darby

[57] ABSTRACT

A temperature control apparatus and method which utilizes a characteristic of a temperature detection device which detects temperature over a wide range of changing temperature and makes it possible to control a unit by detecting a wide range of changing temperature of the unit using the single temperature detection device. A temperature detection circuit outputs a voltage corresponding to the resistance value of the temperature detection device, whose resistance value varies with changes in temperature, which voltage is A/D (analog-to-digital) converted into a digital step value. This digital step value is converted to a temperature value using a predetermined mathematical relationship. The temperature control is executed using the converted temperature value and a desired temperature value in the same data form as the converted temperature value.

10 Claims, 10 Drawing Sheets

TEMPERATURE CONTROL APPARATUS

BACKGROUND OF THE INVENTION

The present invention relates to a temperature control apparatus for detecting the temperature of a unit whose temperature varies over a wide range, such as a heat exchanger placed in a refrigeration cycle, by means of a thermistor to thereby execute temperature control of the unit.

There have recently been in wide use air conditioners for controlling room temperature and humidity and ventilation of the room to provide comfortable atmosphere for human beings in offices, homes, vehicles, and the like.

Many of air conditioners have both air cooling and air heating functions and, during its operation, the room temperature is detected and the detected room temperature is compared with a set temperature to thereby achieve an air-conditioning operation. In the meantime, the temperature of a heat exchanger installed indoors is detected to prevent the heat exchanger from freezing or overheating.

The thermistor (temperature detection device) used as the temperature sensor has its electrical resistance varying with changes in temperature. By connecting a thermistor and a resistor in series and applying a voltage across the series connection, the temperature according to the voltage at the junction point is determined.

There are manufactured various types of thermistors which differ from each other in resistance-temperature characteristic according to the temperature range within which they are used. For example, there is a type which varies its resistance value with changes in temperature over a relatively narrow temperature range of 100° C. or so, a type which changes its resistance value with changes in temperature over a relatively narrow temperature range of 300° C. or so, and, further, a type changing its resistance value over a relatively large temperature range from −20° C. to +80° C. or in a temperature range from 0° C. to +100° C..

Thermistors are different in price according to their features. Those which have a wide detectable temperature range or those of which resistance value greatly changes for a given change in temperature (having good sensitivity) are expensive.

A resistance-temperature characteristic of a thermistor whose resistance value changes over a range of changing temperature of 90° C. is shown in FIG. 7 as an example. When this thermistor is connected as shown in FIG. 10, the point a in FIG. 10 exhibits a voltage-temperature characteristic as shown in FIG. 8. Since the voltage-temperature characteristic of the thermistor becomes a curve as shown in FIG. 8, the voltage value at the point a does not vary uniformly for a given change in temperature.

In the temperature control of air conditioning apparatus of the described type, an A/D converter has previously been used for converting the voltage detected at a point such as a in FIG. 10 into a temperature. Namely, a temperature is given a corresponding value, for example, out of 0 to 255 (1 byte) by the A/D converter and a value previously stored in the microcomputer is compared with the value output from the A/D converter. The temperature control has been executed in accordance with the result of the comparison.

In this case, the comparison of the set temperature and the temperature detected by the thermistor is performed through a comparison between step values, and hence no problem arises even if the characteristic of the thermistor are nonlinear (curvilinear) as described above. However, when the thermistor characteristic is not linear, the value output from the A/D converter does not vary uniformly with respect to a given change in actual temperature.

If, now, there is a relationship expressed by a linear expression between the value x (hereinafter called "step value") obtained by the A/D conversion and the temperature t detected by the thermistor (for example, $x = t + a$), the control will be simple. However, since the step value after the A/D conversion does not change proportionally with temperature in the nonlinear portion of the themistor's characteristic, it becomes necessary, in actually performing the control using the nonlinear portion, to compensate the step value stored within the microcomputer so that this step value will uniformly vary with changes in temperature. From this, problems arise that the processing in the microcomputer becomes complex and that a difference in resolution is produced in the conversion of the temperature to the step value between the resolution in the nonlinear portion and that in the linear portion.

Therefore, it has been known to connect the thermistor in parallel with a resistor R1 as shown in FIG. 11 and detect the voltage at the point b. By so doing, the voltage-temperature characteristic at the point b in FIG. 11 comes to have a linear portion c in its middle portion as shown in FIG. 9. Since the voltage is substantially proportional to the temperature in the portion c, the step value obtained through the A/D conversion also becomes proportional to the temperature, and hence the control circuit becomes simpler. Thus, the portion c has so far been used for temperature detection.

The temperature of the indoor heat exchanger of an air conditioning apparatus varies over a wide range of temperature from −10° C. or so to +70° C. or so when both air cooling and air heating are taken into consideration. If such a wide temperature range is to be detected using low priced thermistors not having a wide detectable temperature range (such as that having a temperature range of about 20° C. as the portion c of FIG. 9), it becomes necessary to use two thermistors, one detecting in a range of about −5° C. to +15° C. in the air cooling domain and the other detecting in a range of about +40° C. to +60° C. in the air heating domain.

This is because, referring to FIG. 12, it is necessary to decrease the number of revolutions of the compressor to suppress its capacity when its temperature becomes lower than +2° C. in the cooling cycle, or to stop the compressor when the temperature becomes lower than 0° C. and remains in this state for two minutes because, then, there is danger lest the compressor be frozen, or in the heating cycle, to decrease the number of revolutions of the compressor to suppress its capacity when the temperature becomes higher than +55° C., or to stop the compressor when its temperature becomes higher than +60° C. taking it for an overheated state.

Incidentally, it has been in practice, when the temperature becomes higher than 5° C. after the compressor was stopped or its capacity was suppressed for preventing the indoor heat exchanger from being frozen, to restore the operation of the compressor to the original state and, when the temperature becomes lower than +47° C. after the compressor was stopped or its capacity was suppressed to protect it from overheating, to restore the operation of the compressor to the original state.

Thus, when a plurality of thermistors are used to cover the wide range of changing temperature of the object whose temperature is to be detected, not only a plurality of thermistors are required, but also the processes for setting up the thermistors and inspecting them increase, and therefore cost is increased. If a thermistor having a wide c portion of FIG. 9 is used, this also increases the cost because such a thermistor is very expensive.

SUMMARY OF THE INVENTION

The present invention was made to solve the above mentioned problems. Accordingly, it is an object of the present invention to provide a temperature control apparatus utilizing the detection characteristic of a temperature detection device (thermistor) over a wide range of changes in temperature, i.e., utilizing the characteristic as it is including its nonlinear portions, whereby it is made possible to control a unit by using a single temperature detection device for detecting a wide range of changes in temperature.

In order to achieve the above mentioned object, an air conditioning apparatus according to the present invention comprises a temperature detection circuit for outputting a voltage corresponding to the resistance value of a temperature detection device whose resistance value varies with changes in temperature and processing means having a step acquiring the aforesaid voltage, after A/D converting the same, and then converting the voltage to a mathematically expressed temperature value using a predetermined relationship and a step performing a process to execute temperature control using the temperature value obtained by the conversion.

DETAILED DESCRIPTION OF THE PREFERRED EMBODIMENT

In the present invention, the air conditioning apparatus is comprised of a temperature detection circuit for outputting a voltage corresponding to the resistance value of a temperature detection device whose resistance value varies with changes in temperature and processing means having a step acquiring the aforesaid voltage, after A/D converting the same, and then converting the voltage to a mathematically expressed temperature value using a predetermined relationship and a step performing a process to execute temperature control using the temperature value obtained by the conversion. This makes it possible to perform calculation for temperature control within the microcomputer on the basis of mathematically expressed actual temperature, not on the basis of the step value corresponding to the temperature. Accordingly, even if a single temperature detection device is used for temperature detection over a wide range of temperature, it is achieved to detect the temperature with uniform resolution and, at the same time, even if the temperature detection device is that having a nonlinear characteristic, it is made possible to use it as that with a linear characteristic.

Figure 2:
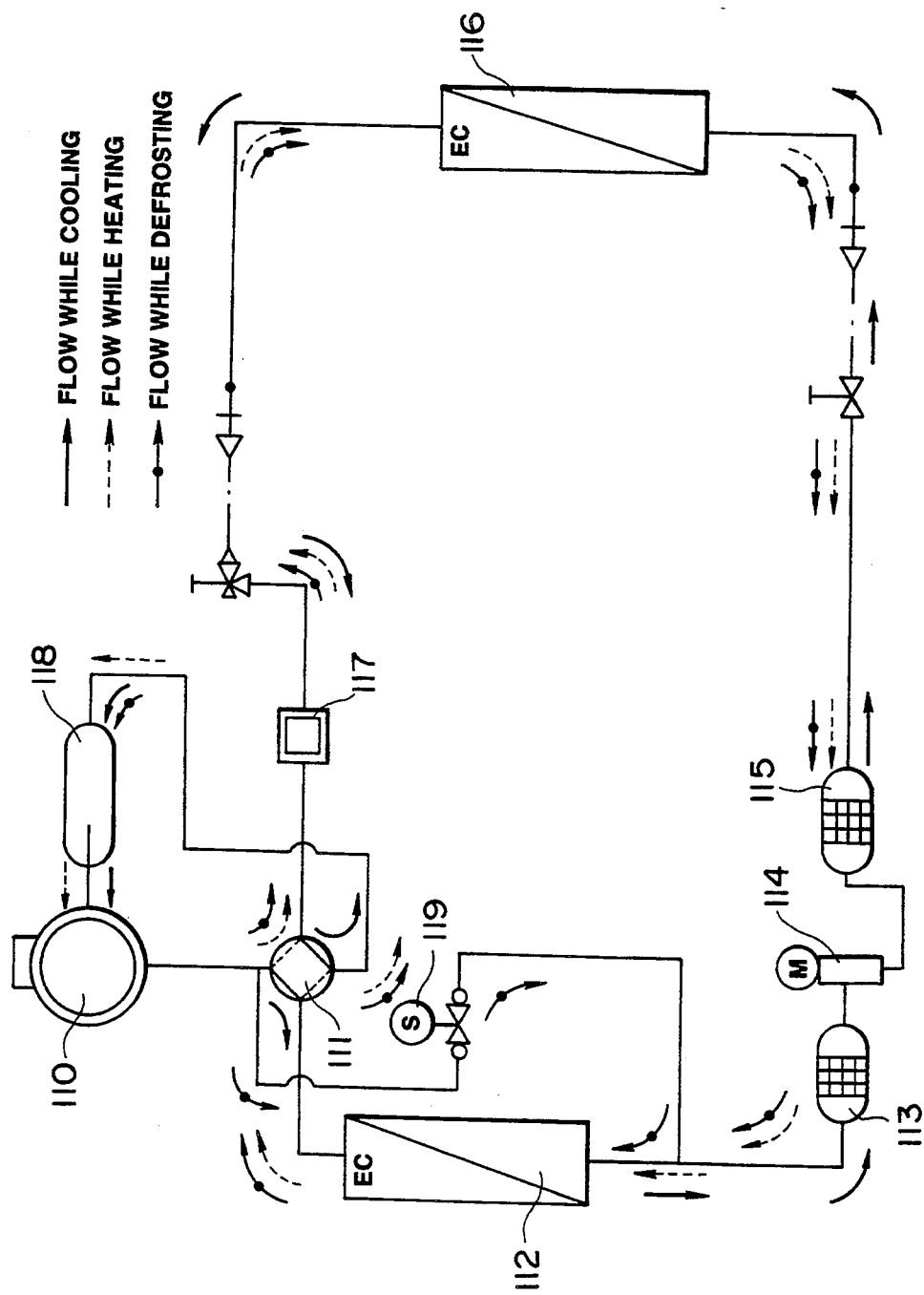
FIG. 2 is a diagram showing a refrigerant cycle in the indoor unit and outdoor unit of an air conditioning apparatus.

An embodiment of the present invention will be described below with reference to the accompanying drawings. FIG. 2 is a refrigerant circuit indicating a refrigeration cycle for an air conditioning apparatus. In the refrigerant circuit diagram, reference numeral 110 denotes a refrigerant compressor (compressor), 111 denotes a four-way valve, 112 denotes an outdoor heat exchanger (heat exchanger on the heat source side), 113 and 115 denote strainers for removing impurities from the refrigerant, 114 denotes a motor-operated expansion valve for varying the reduced pressure of the refrigerant in accordance with the evaporation temperature of the refrigerant, 116 denotes an indoor heat exchanger (heat exchanger on the user side), 117 denotes a silencer, and 118 denotes an accumulator, and these devices are connected by the usual refrigerant piping. Reference numeral 119 denotes an electromagnetic valve which is opened during a defrosting operation.

When the four-way valve 111 is in the state delineated by solid line in FIG. 2, high-temperature and high-pressure refrigerant delivered from the compressor 110 flows in the direction of the arrow drawn by solid line. Accordingly, the outdoor heat exchanger 112 functions as a condenser and the indoor heat exchanger 116 functions as an evaporator and, thus, a cooling operation by means of the indoor heat exchanger 116 is performed.

When the four-way valve 111 is in the state delineated by broken line in FIG. 2, high-temperature and high-pressure refrigerant delivered from the compressor 110 flows in the direction of the arrow drawn by broken line. Accordingly, the outdoor heat exchanger 112 functions as an evaporator and the indoor heat exchanger 116 functions as a condenser and, thus, a heating operation by means of the indoor heat exchanger 116 is performed.

When it becomes necessary to perform a defrosting operation while heating operation is being made, the electromagnetic valve 119 is opened and, thereby, a portion of high-temperature and high-pressure refrigerant delivered from the compressor 110 is directly led to the outdoor heat exchanger (evaporator) 112 so that the outdoor heat exchanger 112 is heated and defrosting of it is performed. At this time, the refrigerant flows in the direction of the dotted solid line in FIG. 2.

Figure 3:
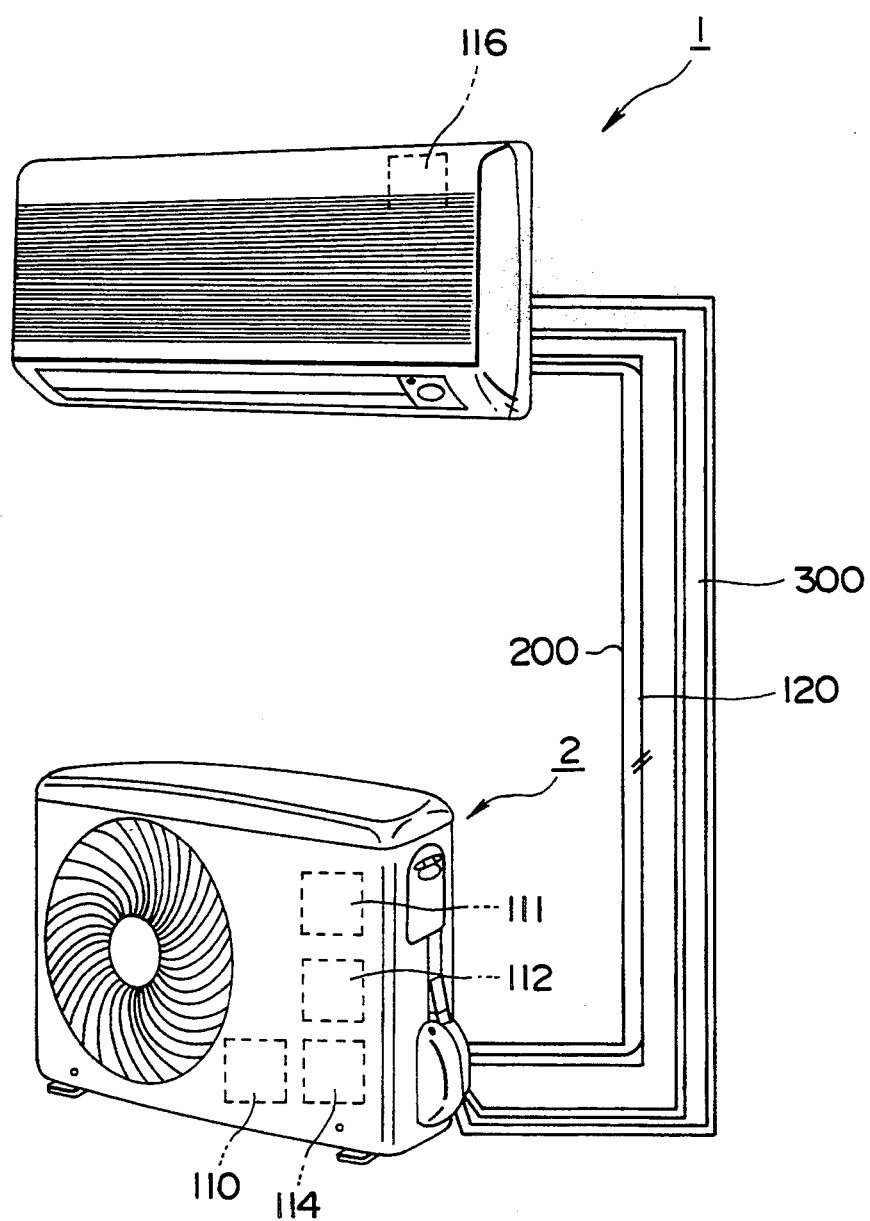
FIG. 3 is a diagram showing an electric connection of the indoor unit and outdoor unit of an air conditioning apparatus.

The air conditioning apparatus is formed, as shown in FIG. 3, of a unit (hereinafter called "indoor unit") 1 installed indoors and a unit (hereinafter called "outdoor unit") 2 installed outdoors. Both the units 1 and 2 are connected by a power line 120, a communication line 200, and refrigerant piping 300.

Further, the indoor unit 1 has the indoor heat exchanger 116 mounted thereon and the outdoor unit 2 has the outdoor heat exchanger 112, compressor 110, motor-operated expansion valve 114, and the four-way valve 111 mounted thereon.

Figure 1:
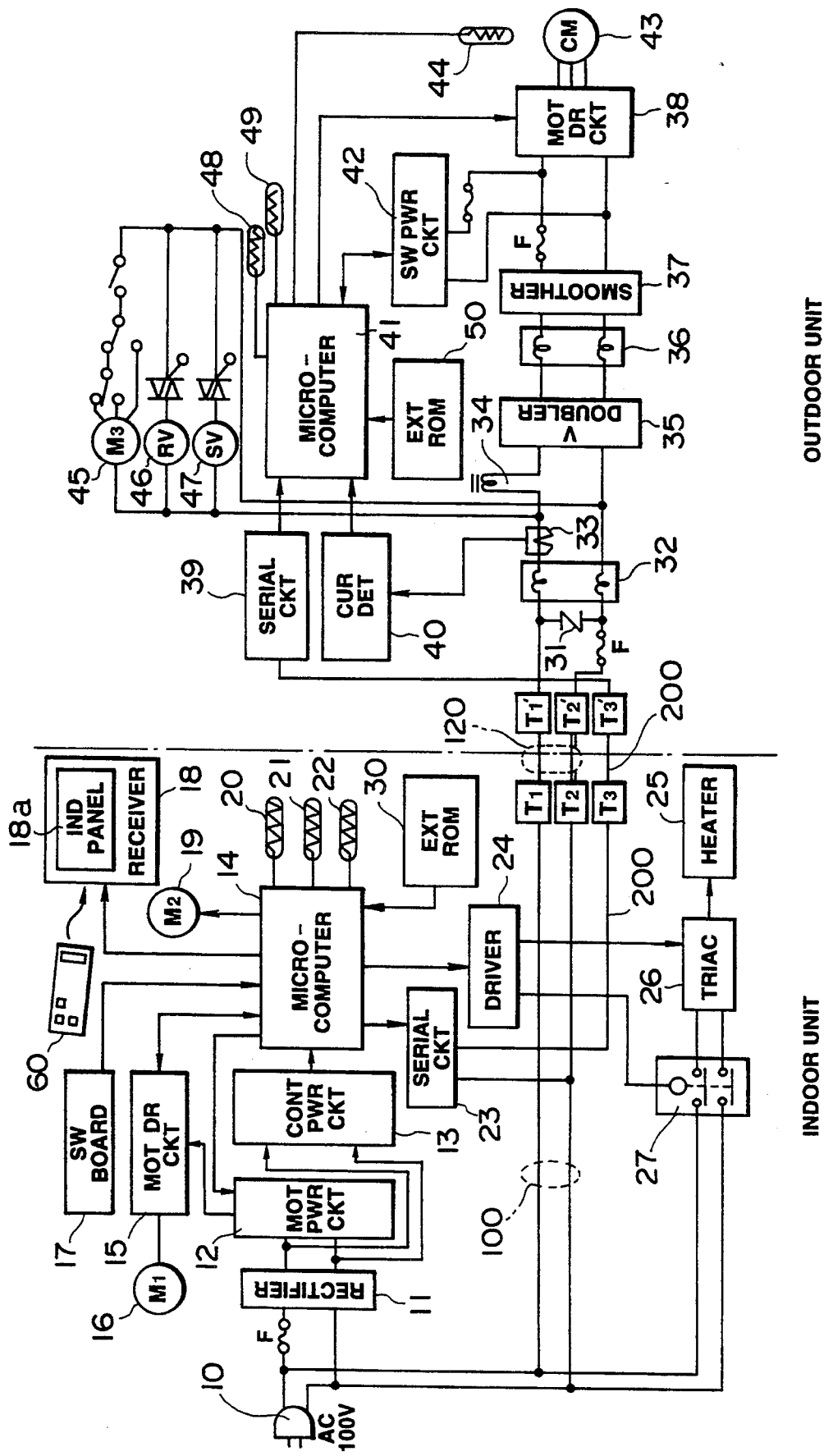
FIG. 1 is a block diagram showing a control circuit of an air conditioning apparatus with a temperature control apparatus according to the present invention applied thereto.

FIG. 1 shows a control circuit for an air conditioning apparatus according to the present invention, in which the circuit portion on the left side of the chain line drawn in the middle of the diagram is the control circuit provided in the indoor unit 1 and the circuit portion on the right side is the control circuit provided in the outdoor unit 2 and they are connected by the power line 120 and communication line 200.

In the control circuit of the indoor unit 1, there are provided a rectifier 11 for rectifying AC voltage 100 V such as supplied from a plug 10, a motor power circuit 12 for setting the voltage of DC power supplied to a DC fan motor (brushless motor) ($M_1$) 16, blowing cool or warm air into the room, to a value between 10 and 36 (V) according to a signal from a microcomputer 14, a controlling power circuit 13 generating 5 V DC power for the microcomputer 14, a motor drive circuit 15 for controlling the timing of current conduction through a stator winding of the DC fan motor 16 in response to a signal from the microcomputer 14 generated thereby according to rotational position information of the DC fan motor 16, a switch board 17 provided on a control panel of the indoor unit 1 including an ON/OFF switch, a test operation switch, etc., a receiver 18a for receiving remote control signals (an ON/OFF signal, a cooling/heating witching signal, a room temperature setting signal, etc.) from a wireless remote controller 60, an indicator panel 18 for indicating the operating status of the air conditioning apparatus, and a flap motor ($M_2$) 19 for moving flaps for changing the blowing direction of the cool/warm air.

There are further provided a room temperature sensor 20 for detecting the room temperature, a heat exchanger temperature sensor 21 for detecting the temperature of the indoor heat exchanger 116, and a humidity sensor 22 for detecting the room humidity. The detected values (voltages) by these sensors 20, 21, and 22 are acquired, after being A/D converted, by the microcomputer 14. Control signals from the microcomputer 14 to the outdoor unit 2 are transmitted through a serial circuit 23 and a terminal board $T_3$. Separately, a triac 26 and a heater relay 27 are controlled by a signal from the microcomputer 14 through a driver 24, whereby the current supply to a reheating heater 25 used during a dehumidifying operation is controlled for phase.

Reference numeral 30 denotes an externally attached ROM storing therein "characteristic data" specifying types of air conditioning apparatuses and various characteristics. From the external ROM 30 storing the characteristic data, the microcomputer 14 acquires such characteristic data immediately after the power has been turned on and immediately after the operation has been stopped. When the power has been tuned on, reception of commands from the wireless remote control 60 and the later described detection of the states of the operation and test operation switches are not performed until the acquisition of the characteristic data from the external ROM 30 is completed.

The control circuit for the outdoor unit 2 will be described below.

In the outdoor unit 2, there are provided terminal boards $T_1'$, $T_2'$, and $T_3'$ connected with the terminal boards $T_1$, $T_2$, and $T_3$ of the indoor unit 1, respectively. Reference numeral 31 denotes a varistor connected parallel to the terminal boards $T_1'$ and $T_2'$, 32 denotes a noise filter, 34 denotes a reactor, 35 denotes a voltage doubler, 36 denotes a noise filter, and 37 denotes a smoother for smoothing the double voltage generated by the voltage doubler 35, and by means of which, a DC voltage of approximately 280 V is obtained from an AC voltage of 100 V.

Reference numeral 39 denotes a serial circuit for signal conversion of the control signal from the indoor unit 1 input through the terminal board $T_3'$ into a signal to be transmitted to a microcomputer 41, 40 denotes a current detection circuit for detecting the current supplied to the outdoor unit 2 with a current transformer (CT) 33, converting the detected signal into a DC voltage, and supplying the DC voltage to the microcomputer 41, 41 denotes the microcomputer, and 42 denotes a switching power circuit for generating the power voltage for the microcomputer 41. Reference numeral 38 denotes a motor drive circuit for PWM controlling the current supply to a later described compressor motor 43 in accordance with a control signal from the microcomputer 41, in which six power transistors are connected in a three-phase bridge form to constitute a so-called inverter device. Reference numeral 43 denotes the compressor motor for driving the compressor 110 of the refrigeration cycle, 44 denotes a delivery temperature sensor for detecting the refrigerant temperature on the delivery side of the compressor 110, 45 denotes a fan motor whose speed can be varied to three speeds and performs air blasting to an outdoor heat exchanger 112. Reference numerals 46 and 47 denote coils for the four-way valve 111 and electromagnetic valve 119, respectively, for shifting the paths of the refrigerant in the refrigeration cycle.

Further, the outdoor unit 2 is provided with an outside air temperature sensor 48 in the vicinity of the air inlet for detecting the temperature of the outside air and, further, a heat exchanger temperature sensor 49 for detecting the temperature of the outdoor heat exchanger 112, and the detected values (voltages) by these sensors are acquired by the microcomputer 41 after being A/D converted.

Reference numeral 50 denotes an externally attached ROM having the same function as that of the external ROM 30 of the indoor unit 1. The ROM 50 stores therein characteristic data of the outdoor unit 2 similar to those described above for the external ROM 30.

Incidentally, reference characters F's shown in control circuits for the indoor unit 1 and outdoor unit 2 denote fuses.

The microcomputer (processing means) 14 is of such a structure that has a ROM storing programs previously written therein, a RAM for storing reference data, and a CPU for executing programs all put in one package (for example, INTEL Corporation model 8797JF (TRADENAME of INTEL Corporation)).

Figure 4:
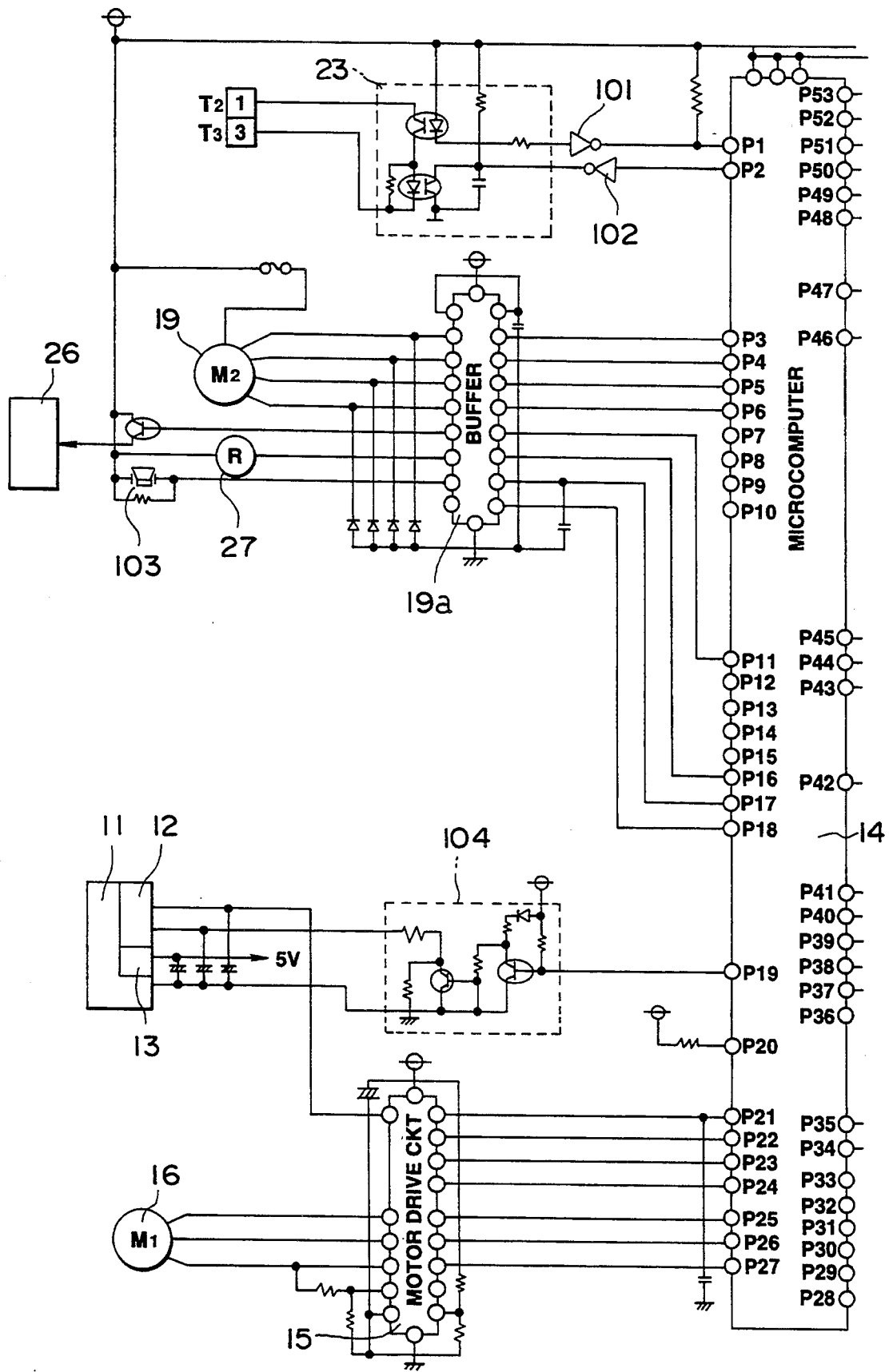
FIG. 4 is a wiring diagram of a portion of the control circuit shown in FIG. 1.
Figure 5:
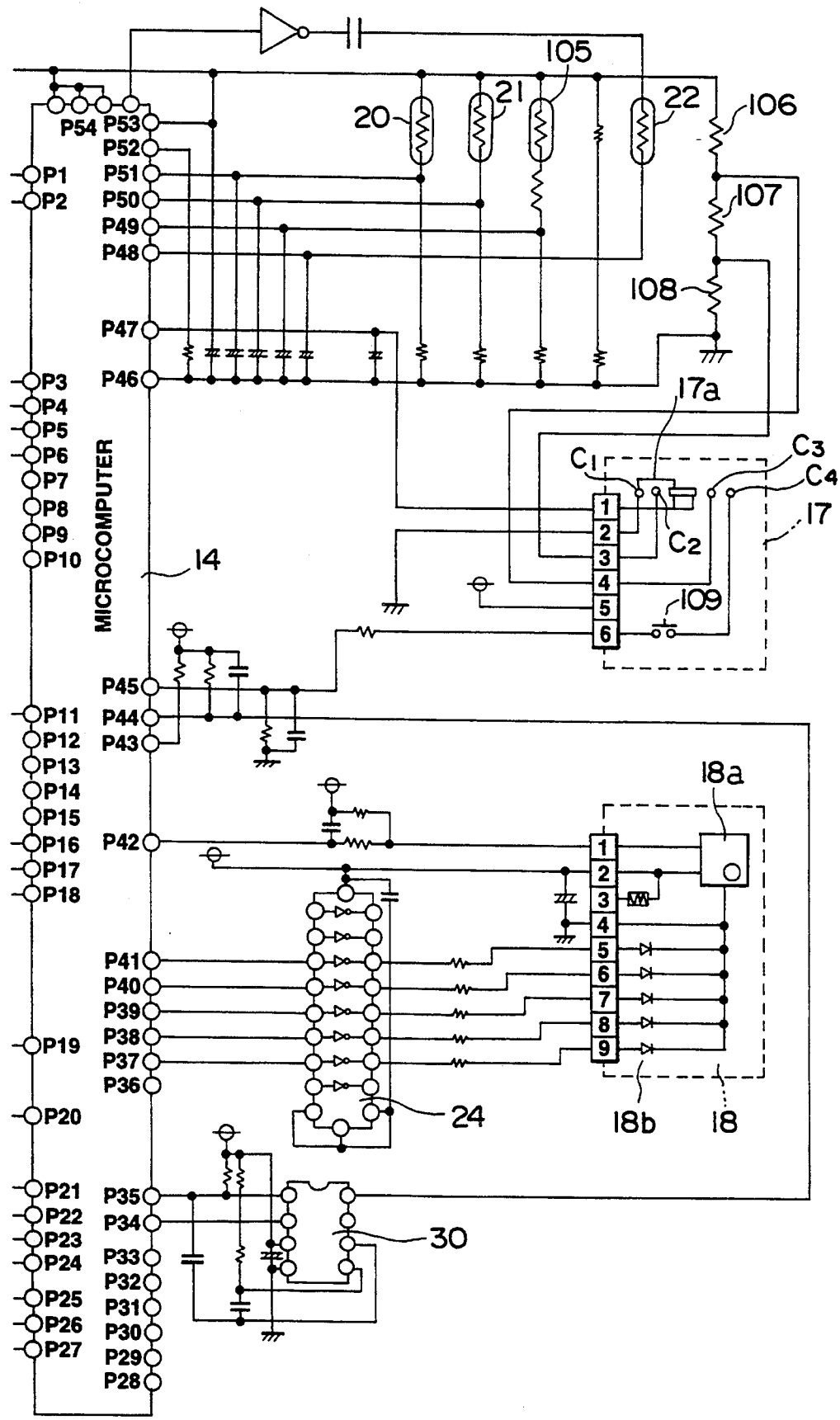
FIG. 5 is a wiring diagram of the other remaining portion of the control circuit shown in FIG. 1.

FIG. 4 and FIG. 5 are wiring diagrams of the portions around the microcomputer 14 of the indoor unit 1 of the electric connection diagram shown in FIG. 3. FIG. 4 shows the wiring on the left side pin-layout of the chip of the microcomputer 14 and FIG. 5 shows the wiring on the right side pin-layout of the microcomputer 14. FIG. 4 and FIG. 5 put together is the complete wiring diagram. In these diagrams, component parts the same as the component parts in FIG. 1 are denoted by the corresponding reference numerals.

Referring to FIG. 4, the microcomputer 14 outputs control data to be transmitted to the outdoor unit 2 from the port P1 so that the signal is supplied to the serial circuit 23 through a buffer 101. The serial circuit 23 outputs the control data to the communication line 200 connecting the indoor unit 1 and the outdoor unit 2. When receiving control data from the outdoor unit 2, the microcomputer 14 receives it through the communication line 200, the serial circuit 23, and a buffer 102 and from the port P2. The serial circuit 23 achieves inputting of the control data between the communication line 200 and the buffers 101 and 102 using photocouplers.

The output ports P3 to P6 output the driving signal of the flap motor 19. As the flap motor 19 is used a step motor. The angle of rotation of the flap motor 19 can be changed by supplying the coil of the flap motor 19 with current by signals output from the output ports P3 to P6. Incidentally, the signals output from the output ports P3 to P6 are amplified in power to the level to be supplied to the coil of the flap motor 19 by a buffer 19a.

The output port P11 outputs a triggering signal for the triac 26, the output port P17 outputs a signal controlling the current supply to the heater relay 27, and the output port P18 outputs a signal for causing a buzzer 103 to produce a sound. Each of these signals is amplified in power in the buffer 19a.

The output port P19 outputs a signal of DC voltage to be used for a power supply to the fan motor 16. This signal of DC voltage is formed of a pulse train in which the duty factor of the pulse is changed. The pulse train is converted to a DC voltage in a conversion circuit 104. This DC voltage is supplied to the motor power circuit 12. The motor power circuit 12 supplies a DC power with the voltage corresponding to the DC voltage to a motor drive circuit 15. Accordingly, the voltage supplied to the motor drive circuit 15 can be varied by changing the duty factor of the pulse train output from the port P19. While it is described later, the number of revolutions of the fan motor 16 can be varied by varying the voltage supplied to the motor drive circuit 15 because a brushless motor is used for the fan motor 16.

The conversion circuit 104 is chiefly formed of transistors, resistors, and a smoothing capacitor, not shown.

The input port P21 inputs a signal for controlling the timing of the current supply to the fan motor (three-phase brushless motor) 16. This signal is a signal obtained when the current flowing through each stator winding of the three-phase brushless motor changes its polarity across the neutral point and this signal is obtained six times for each rotation of the motor. The circuit to obtain the signal is incorporated in the motor drive circuit 15 (Sanyo Electric Co., Ltd. model Hybrid ICKA160 (TRADENAME of Sanyo Electric Co., Ltd.)). In the motor drive circuit 15, there are further incorporated an inverter circuit with six power transistors connected in a three-phase bridge form and a switching circuit achieving high speed turning ON/OFF of the power transistors (a circuit substantially making shorter the discharging time of the accumulated charges between the base and the emitter of the power transistor).

Accordingly, by turning ON/OFF the power transistors in sequence of predetermined combination of ON/OFF states and in accordance with the angle of rotation of the rotor of the motor, the fan motor 16 can be rotated. The ON/OFF signals for each of the power transistors based on the combination of ON/OFF states are output from the output ports P22 to P27 of a microcomputer 14.

The microcomputer 14 performs predetermined calculation on the basis of the signal (the signal-to-signal time) received from the port P21 to thereby determine the angle of rotation of the rotor and, thereupon, outputs the ON/OFF controlling signals in conformity with the angle of rotation from the ports P22 to P27 to the motor drive circuit 15.

Referring now to FIG. 5, an output of a room temperature sensor 20 is input to the port 51, an output of the heat exchanger temperature sensor 21 is input to the port P50, an output of an illuminance sensor 105 (CdS) is input to the port P49, and an output of a humidity sensor 22 is input to the port P48 of the microcomputer 14. These outputs are A/D (analog-to-digital) converted at the ports P51, P50, P49, and P48 and then stored as data in the ROM within the microcomputer 14. The switch board 17 is provided with contacts $C_1$ to $C_4$ for complete stopping, operation, test operation, fault diagnosis, etc. and for which there is provided a slider 17a to be manually slided sideways. The potentials at the contacts $C_1$ to $C_4$ are arranged to assume four steps of mutually different values by means of resistors 106 to 108 and the voltage 5 (V). Therefore, by checking the potential value at the input port P47 (A/D converting input port), it can be determined with which contact the slider 17a is in contact. The switch 109 for fault diagnosis is connected with the port P45 of the microcomputer 14. A remote control signal received by the receiver 18a is input to the port P42 of the microcomputer 14. From the ports P36 to P41 are output signals for turning on light emitting diodes 18b on the indicator panel 18 indicating the mode, i.e., operation, automatic cooling, automatic heating, and defrosting.

The ports P34, P35, and P44 of the microcomputer 14 are connected with the external ROM 30 so that the microcomputer 14 can read the above described characteristic data stored in the ROM 30 according to the need.

When reading a set of the characteristic data, the microcomputer 14 resets the external ROM 30 with a signal output from the port P34 as shown in FIG. 5, outputs a clock from the port P35, inputs the data corresponding to the clock from the port P44, and stores the data in the internal RAM. As the external ROM, a one time programmable sequential read only memory, for example, Fujitsu, Ltd. model MB85419P (TRADENAME of Fujitsu, Ltd.) is used.

Now, description will be made on temperature detection of the indoor heat exchanger 116 by the heat exchanger temperature sensor 21 having a great range of changing temperature.

Figure 7:
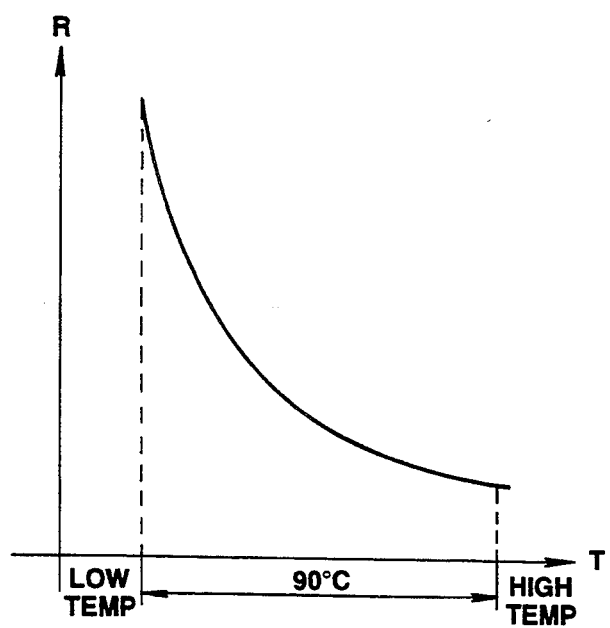
FIG. 7 is a diagram showing a temperature-resistance characteristic of a thermistor.

Voltage depending on the change in the resistance value of the indoor heat exchanger temperature sensor 21 varies as shown in FIG. 7 and input to the port P50 of the microcomputer 14 as shown in FIG. 5.

The microcomputer 14 accepts the voltage applied to the port P50, i.e., the voltage varying with the detected temperature of the heat exchanger temperature sensor 21, having the signal A/D (analog-to-digital) converted. The A/D conversion is performed, with a predetermined voltage range (the range between $V_H$ and $V_L$ shown in FIG. 8) divided into 1024 steps (0 to 255), by obtaining the step value x corresponding to the voltage applied to the port P50.

Figure 8:
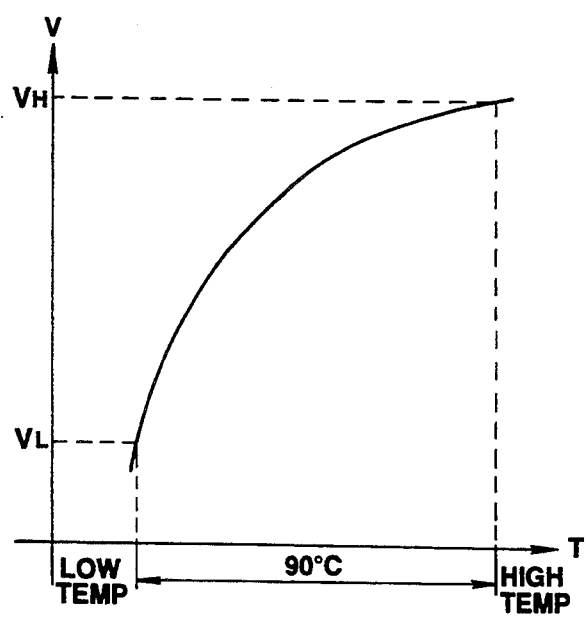
FIG. 8 is a diagram showing a temperature-voltage characteristic of a thermistor at the point a shown in FIG. 10.

Thus, the microcomputer 14 can obtain the step value corresponding to the voltage applied to the port port P50. In the case where a sensor having such a characteristic as shown in FIG. 8 is used, the relationship between the above voltage and the temperature detected by the heat exchanger temperature sensor 21 can be given by the following approximate expression $$V = dt^3 + et^2 + ft + g \quad (1)$$

where V is the voltage (or the number of step x), t is the temperature detected by the heat exchanger temperature sensor 21, and d, e, f, and g are constants depending on the characteristics of the thermistor.

Incidentally, the approximate expression of the relationship between the voltage and the temperature is not limited to the above expression (1) but may be set up suitably according to the characteristics of the thermistor to be used.

The microcomputer 14 has the expression (1) stored therein and inversely calculate the temperature detected by the heat exchanger temperature sensor 21 of the indoor heat exchanger 116 using the expression (1) from the number of step x obtained by A/D conversion (value converted from voltage), and stores the result of calculation as a mathematically expressed temperature value (for example +25° C., +30° C., +35° C.) into its storage portion.

Incidentally, it takes a long processing time for a microcomputer 14 (a microcomputer with a slow processing speed) to actually calculate the temperature value t inversely from the expression (1) because calculation of square root and cubic root are then required to be made, and hence, such a problem arises, when some abnormality occurs in the air conditioning apparatus, that the countermeasure against it cannot be taken in time. Therefore, it is arranged such that the microcomputer 14 stores in advance a following approximate expression (2) indicating the characteristic of the temperature t corresponding to the voltage value (the step value x) based upon the characteristic of FIG. 8 and calculates the temperature value t directly from the step value x using the expression (2) and stores it into its storage portion $$t = d'x^3 + e'x^2 + f'x + g' \quad (2)$$

where t is the temperature value, x is the step value, and d', e', f', and g' are constants.

Figure 6:
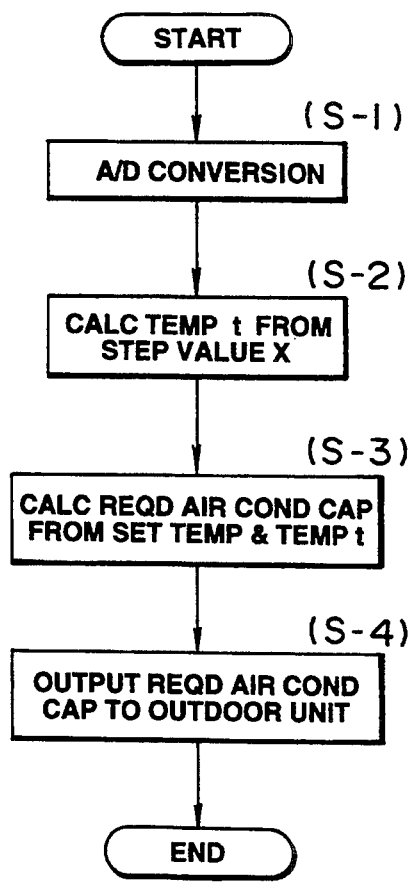
FIG. 6 is a flow chart of a process adjusting the air conditioning capacity of an air conditioning apparatus according to the present invention.

The operations related to the above are given in a flow chart of FIG. 6. In step (S-1), the microcomputer 14 A/D converts the voltage applied to the port P50 and obtains the step value x. Then, it, in step (S-2), calculates the temperature value t from the step value x using the expression (2) and stores the temperature value t into the storage portion.

In step (S-3), the microcomputer 14 calculates the required air conditioning capacity on the basis of the set temperature value (for example +25° C.) and the temperature value t stored in the storage portion. In calculating the air conditioning capacity, PID control, the fuzzy logic, etc. is applied to the difference between the set temperature and the temperature t and the variation Δt of the temperature value t. In step (S-4), the microcomputer 14 outputs the values indicative of the air conditioning capacity (calorific value, wattage, values indicative of the operating capacity of the compressor motor 43 (number of revolutions, frequency, etc.)) to the outdoor unit. The outdoor unit controls the operation of the compressor motor 43 in accordance with the above values to thereby provide the required air conditioning capacity.

In the present invention as described above, the temperature within the range of detection (90° C.) of a thermistor as it is can be dealt with as the temperature value t by the microcomputer 14, and from which, the temperature expressed by the voltage within the range from $V_L$ to $V_H$ can be obtained.

When the present invention was not used, the PID or fuzzy calculation was made using the step value obtained by the microcomputer 14 through A/D conversion as described above and the step value previously stored within the microcomputer 14. Therefore, it was required that there exists the relationship $x = t + \alpha$ ($\alpha$ is a constant) between the step value obtained by the A/D conversion and the temperature detected by the thermistor, and hence in the portion where this relationship does not hold (the nonlinear portion), it was necessary to compensate the previously stored step value so that the variation in the step value with respect to the temperature is linearized. Therefore, the resolution was different with temperature and a complicated calculation process had to be additionally provided for the compensation in the microcomputer 14. Thus, there was a problem that the storage capacity of the microcomputer was considerably used for the storage area of the programs.

However, since the temperature value as mathematically expressed actual temperature value is used in the present invention, there is produced no difference in resolution. Therefore, even if the range of detected temperature of the heat exchanger temperature sensor 21 is expanded, detection with the same resolution can be attained and a non-linear characteristic can be controlled as a linear characteristic.

The control of the compressor motor 43 in the present embodiment is executed such that the temperature of the indoor heat exchanger 116 is determined on the basis of an average of temperature values obtained by 16 times of detection thereof, each detection being made every 2 msec. Namely, the compressor motor 43 is controlled once in each 32 msec. The control of the compressor motor 43, in concrete terms, means adjustment of the frequency of the three-phase AC voltage for operating the compressor motor 43 so that the number of revolutions of the compressor motor 43 is varied or the compressor motor 43 is stopped.

Although, in the above described embodiment, the expression of third order expressed as (1) was used in obtaining the temperature value t from the output of the heat exchanger temperature sensor 21, it was confirmed through a number of tests that the similar results can be obtained if the expression is a polynomial of third order or above.

Although, in the above described embodiment, the example in which the present invention was applied to detection of the temperature of the indoor heat exchanger 116 of an air conditioning apparatus was described, the present invention is not limited to such application but is of course applicable to temperature detection of other part of an air conditioning apparatus and further to temperature detection in other apparatus than air conditioning apparatus.

Figure 9:
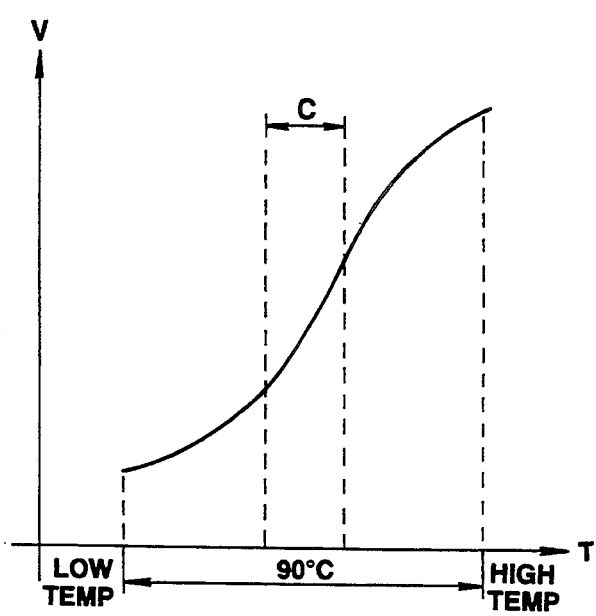
FIG. 9 is a diagram showing a temperature-voltage characteristic of a thermistor at the point b shown in FIG. 11.
Figure 10:
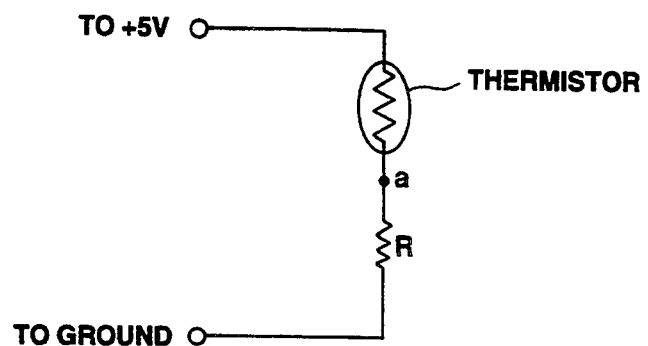
FIG. 10 is a diagram showing an example of electric connection of a thermistor.
Figure 11:
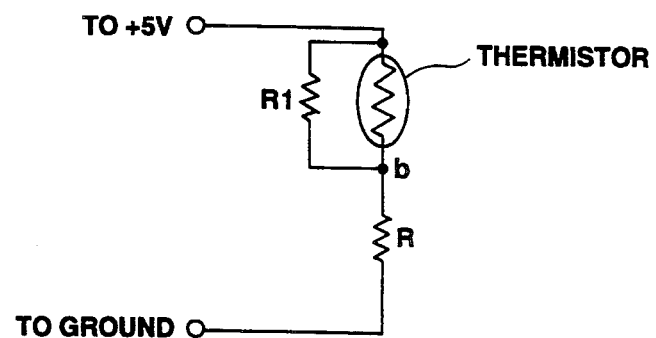
FIG. 11 is a diagram showing another example of electric connection of a thermistor.
Figure 12:
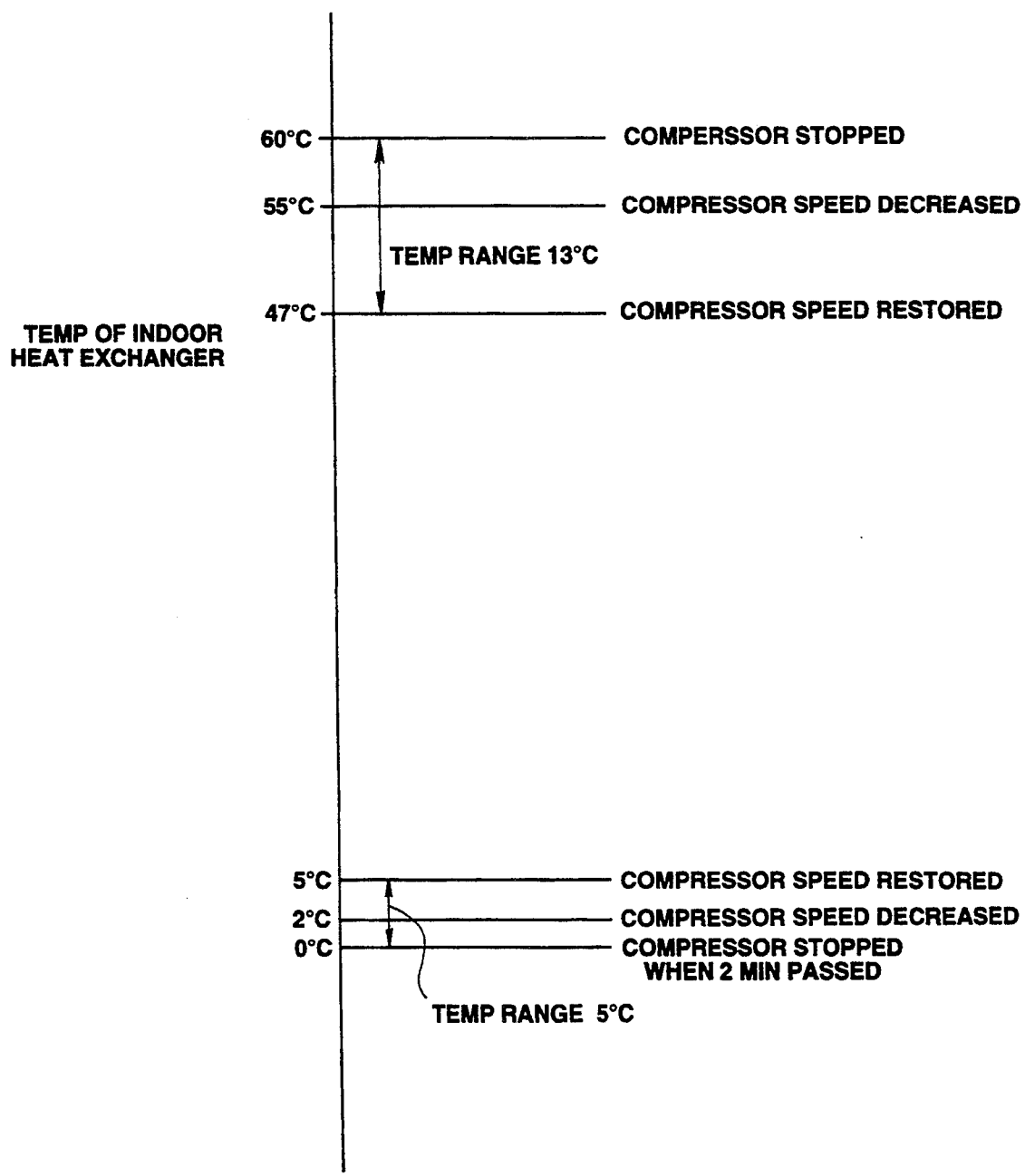
FIG. 12 is a diagram showing a manner of compressor control executed according to changes in temperature of an indoor heat exchanger.

Although, in the above described embodiment, the example in which temperature detection was made with a thermistor connected as shown in FIG. 4 or FIG. 10 and with a temperature-voltage characteristic as shown in FIG. 8 expressed by an approximate expression was described, the present invention is not dependent on the manner in which the thermistor is connected. For example, the thermistor may be connected as shown in FIG. 11 and its temperature-voltage characteristic as shown in FIG. 9 may be expressed by an approximate expression to achieve temperature detection.

As described in the foregoing, it has been made possible by the present invention to achieve temperature detection over a wide range of temperature using a single temperature detection device (thermistor) by utilizing the temperature characteristic of the temperature detection device as it is. Therefore, even when the temperature of an object whose temperature varies over a wide range is to be detected, the temperature sensor can be structured of a single temperature detection device. Thus, the number of temperature detection devices to be used can be decreased and, hence, manufacturing and inspection processes can be decreased and cost reduction can thereby be achieved.

Especially according to the present invention, the calculation for temperature control within the microcomputer can be performed not according to the step value corresponding to temperature but according to the actual temperature value which can be mathematically expressed. Therefore, even if a single temperature detection device is used over a wide range of temperature, temperature detection with uniform resolution can be achieved and, at the same time, even if the temperature detection device is that with a nonlinear characteristic, the-temperature control can be performed using the same as that with a linear characteristic.

What is claimed is:

1. A temperature control apparatus for executing control of operation of a unit on the basis of a detected temperature comprising:

a temperature detection circuit including a temperature detection device whose resistance value varies with a detected temperature for outputting a DC voltage corresponding to the resistance value of said temperature detection device; and processing means for A/D (analog-to-digital) converting said outputted voltage into a digital step value corresponding to one of a plurality of step values of an output voltage range of said temperature detection circuit corresponding to a range of resistance values of said detection device, and then converting said digital step value to a mathematically expressed temperature value using a predetermined mathematical relationship and executing temperature control of the unit using said temperature value obtained by the conversion.

2. Apparatus as in claim 1 wherein said detection device has a nonlinear resistance versus temperature characteristic.

3. A temperature control apparatus for executing control of operation of a unit on the basis of a detected temperature comprising:

a temperature detection circuit including a temperature detection device whose resistance value varies with a detected temperature for outputting a DC voltage corresponding to the resistance value of said temperature detection device;

A/D converting means for converting said DC voltage into a digital value of one of the steps of a range of digital step values corresponding to said DC voltage and outputting said digital step value;

numerical value conversion means for mathematically calculating from said digital step value a temperature value in accordance with a predetermined mathematical function;

means for storing a desired temperature value in the same data form as the mathematically calculated temperature value; and processing means for executing control of said unit using said stored calculated temperature value and said desired temperature value.

4. A temperature control apparatus according to claim 3, wherein said predetermined mathematical function is a characteristic expression indicative of the temperature versus step value relationship obtained from a characteristic mathematical expression indicative of the temperature versus resistance value relationship of said temperature detection device, a characteristic expression indicative of the resistance value versus voltage relationship of said temperature detection circuit, and a characteristic expression indicative of voltage versus step value relationship of said A/D converting means.

5. A temperature control apparatus as in claim 3 wherein said A/D converting means, said numerical value conversion means, and said processing means are all part of a microprocessor.

6. Apparatus as in claim 3 wherein said detection device has a nonlinear resistance versus temperature characteristic.

7. Apparatus as in claim 3 wherein said temperature detection circuit operates over a predetermined range of resistance value of said temperature detection device.

8. A temperature control method for executing control of operation of a unit on the basis of a detected temperature comprising the steps of:

providing a temperature detection device whose resistance value varies with changes in a detected temperature;

obtaining a voltage corresponding to the resistance value of said temperature detection device caused by the temperature it detects;

A/D converting said voltage into a digital step value corresponding to said temperature detected by said detecting means;

converting said digital step value to a mathematically expressed temperature value in accordance with a predetermined mathematical function and storing said converted value;

storing a desired temperature value in the same form as said mathematically expressed temperature value; and processing to execute control of said unit using said stored temperature value and said desired temperature value.

9. A temperature control method according to claim 8, wherein said predetermined mathematical function is a characteristic expression indicative of the temperature versus step value relationship obtained from a characteristic expression indicative of the temperature versus resistance value relationship of said temperature detection device, a characteristic expression indicative of the resistance value versus voltage relationship of said temperature detection circuit for outputting the voltage corresponding to the resistance value of said temperature detection device, and a characteristic expression indicative of the voltage versus step value relationship of said A/D conversion means for A/D converting said voltage.

10. A method as in claim 8 wherein said detection device has a nonlinear resistance versus temperature characteristic.

* * * * *